(12) United States Patent
Doljack

(10) Patent No.: US 6,595,422 B1
(45) Date of Patent: Jul. 22, 2003

(54) BAR CODE READER

(75) Inventor: Frank A. Doljack, Pleasanton, CA (US)

(73) Assignee: Assure Systems, Inc., Pleasanton, CA (US)

( * ) Notice: Subject to any disclaimer, the term of this patent is extended or adjusted under 35 U.S.C. 154(b) by 0 days.

(21) Appl. No.: 09/338,333

(22) Filed: Jun. 23, 1999

(51) Int. Cl.$^7$ ................................................ G06K 7/10
(52) U.S. Cl. ........................... 235/462.42; 235/462.43; 235/462.44
(58) Field of Search ..................... 235/454, 462.01, 235/462.06, 462.42, 462.45, 462.14, 462.43, 472.01, 462.44

(56) References Cited

U.S. PATENT DOCUMENTS

| | | | | |
|---|---|---|---|---|
| 5,155,346 A | * | 10/1992 | Doing et al. | 235/462.45 |
| 5,412,221 A | * | 5/1995 | Curtis et al. | 250/573 |
| 5,697,699 A | * | 12/1997 | Seo et al. | 235/462.42 |
| 5,744,790 A | * | 4/1998 | Li | 235/462.24 |
| 5,825,011 A | * | 10/1998 | Suzuki et al. | 235/462.01 |
| 6,247,645 B1 | * | 6/2001 | Harris et al. | 235/454 |

* cited by examiner

*Primary Examiner*—Thien M. Le
*Assistant Examiner*—Larry D Taylor
(74) *Attorney, Agent, or Firm*—Renner, Otto, Boisselle & Sklar, LLP

(57) ABSTRACT

An apparatus and method for reading a bar code on an object includes a light diffusing cavity and a deflector. The deflector deflects and diffuses light from a light source which may be part of a bar code reader. Preferably the deflector deflects substantially all of the light from the reader, so that none of the light from the light source directly illuminates the bar code. Inner side wall surfaces of the light diffusing cavity redirect the deflected light to indirectly illuminate the bar code. Despite deflecting light from the light source, the deflector allows unhindered passage of light emanating from the bar code to a light detection system which may be part of the bar code reader.

35 Claims, 4 Drawing Sheets

BAR CODE READER

Figure 1:
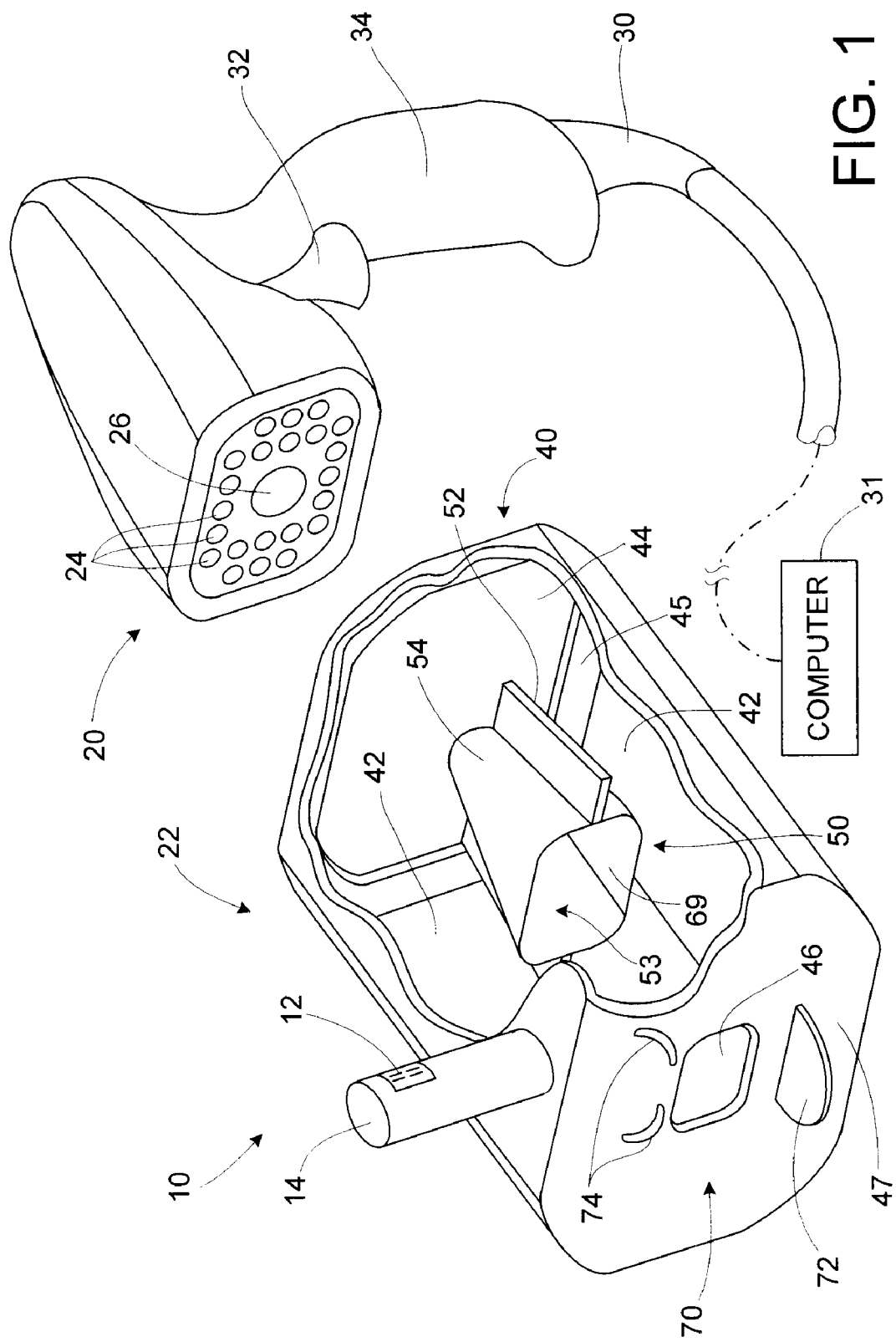

The present invention involves optical devices and methods for detecting coded symbols, particularly optical devices for reading bar codes and other symbols representing data.

Bar codes are increasingly used on products and other objects to encode information in machine readable forms. A bar code containing encoded information is placed on the object. The bar code may be read by use of a bar code reader or scanner which uses an optical method to read the bar code.

A variety of bar code languages, or symbologies, are presently in use. Although early symbologies were one dimensional, that is they encoded information in one dimension only, two-dimensional bar code symbologies are becoming increasingly popular due to the growing desirability to encode increasing amounts of information in smaller and smaller spaces. Examples of different types of two-dimensional bar codes include stacked symbologies (e.g., linear bar codes stacked on top of each other), matrix symbologies (e.g., a matrix of light and dark elements, circles, squares, or hexagons), or packet symbologies (e.g., a collection of linear symbols which appear to be randomly arranged on a page). Examples of the three types include, respectively, PDF417, Code 49, and Code 16K (stacked); Code One, MaxiCode, Data Matrix, Aztec Code, and QR Code (matrix); and Super Code (packet).

An exemplary application for two-dimensional bar codes is on singly-packaged cigarettes, which have bar code information placed thereupon to verify that the required taxes have been paid. The surface area for bar codes on such packaging is rather small, and, therefore, two-dimensional bar codes are useful to provide a large amount of information in a small space. Other uses of bar codes include price information, information useful to discover counterfeiting, model or manufacturing information, and many others.

Along with their advantage of enabling storage of vast amounts of data (data and information may be used interchangeably and substantially equally herein), two-dimensional bar codes have the disadvantage of introducing some difficulties in bar code reading. Although some stacked two-dimensional codes can be read with a rastering laser system, most two-dimensional symbologies require a vision-based reader to read the encoded data.

In such a vision-based reader the bar code is illuminated by a light source and the resulting image is focused on an array of photodetectors such as charge coupled devices (CCDs). An electrical signal is applied to the CCD array and the light value at each photodetector is read. This signal is processed and decoded to reveal the information encoded in the bar code.

Non-uniform illumination can cause difficulties for vision-based readers in that the non-uniform illumination leads to readings by the photodetectors which do not correspond to the information in the bar code.

A particular non-uniform illumination problem occurs when a bar code has a shiny surface. The shiny surface can reflect the light used to illuminate it, causing a region or line of glare to appear on the bar code. This glare increases the difficulty of reading the bar code because the software for processing the images may be unable to compensate for the differing amounts of light emanating from different parts of the bar code. This may result in incorrect readings or having to read the bar code several times in order to obtain an acceptable reading, or may result in parts of the bar code being unreadable.

Particularly susceptible to glare lines are bar codes on curved surfaces or surfaces which are not substantially flat, such as those on the cylindrical containers used for singly-packaged cigarettes.

From the foregoing it is seen that there is a need for improved bar code readers and methods for reading bar codes that reduce the problem of glare and other nonuniformities in illumination.

An apparatus and method for reading a bar code on an object includes a light diffusing cavity and a deflector. The deflector deflects and diffuses light from a light source which may be part of a bar code reader. Preferably the deflector deflects substantially all of the light from the reader, so that none of the light from the light source directly illuminates the bar code. Inner side wall surfaces of the light diffusing cavity redirect the deflected light to indirectly illuminate the bar code. Despite deflecting light from the light source, the deflector allows unhindered passage of light emanating from the bar code to a light detection system which may be part of the bar code reader.

According to an aspect of the invention, an apparatus for use in reading a bar code using a conventional bar code reader includes a housing with respect to which a bar code reader and a bar code may be placed, and having a deflector preventing at least a portion of light emitted by a light source from directly impinging upon the bar code, and at least one surface directing to the bar code at least some of the at least a portion of light.

According to an aspect of the invention, an apparatus for use in reading a bar code includes a deflector for preventing at least a portion of light emitted by a light source from directly impinging upon the bar code, and at least one surface for directing to the bar code at least some of the at least a portion of light.

According to another aspect of the invention, a method for reading a bar code includes indirectly illuminating the bar code by using a deflector between a light source and the bar code, the deflector deflecting at least a portion of source light emanating from the light source; and receiving light emanating from the bar code for decoding.

According to another aspect of the invention, a method for reading a bar code includes indirectly illuminating the bar code by using a deflector between a light source and the bar code, the deflector deflecting at least a portion of source light emanating from the light source; and receiving light emanating from the bar code through an opening in the deflector.

According to yet another aspect of the invention, an apparatus for use in reading a bar code includes a deflector between a light source location and a bar code location, the deflector preventing at least a portion of light emitted at the light source location from directly reaching the bar code location; and at least one surface at least partially in the path of the at least a portion of light, the at least one surface directing at least some of the portion of light to the bar code location.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Figure 2:
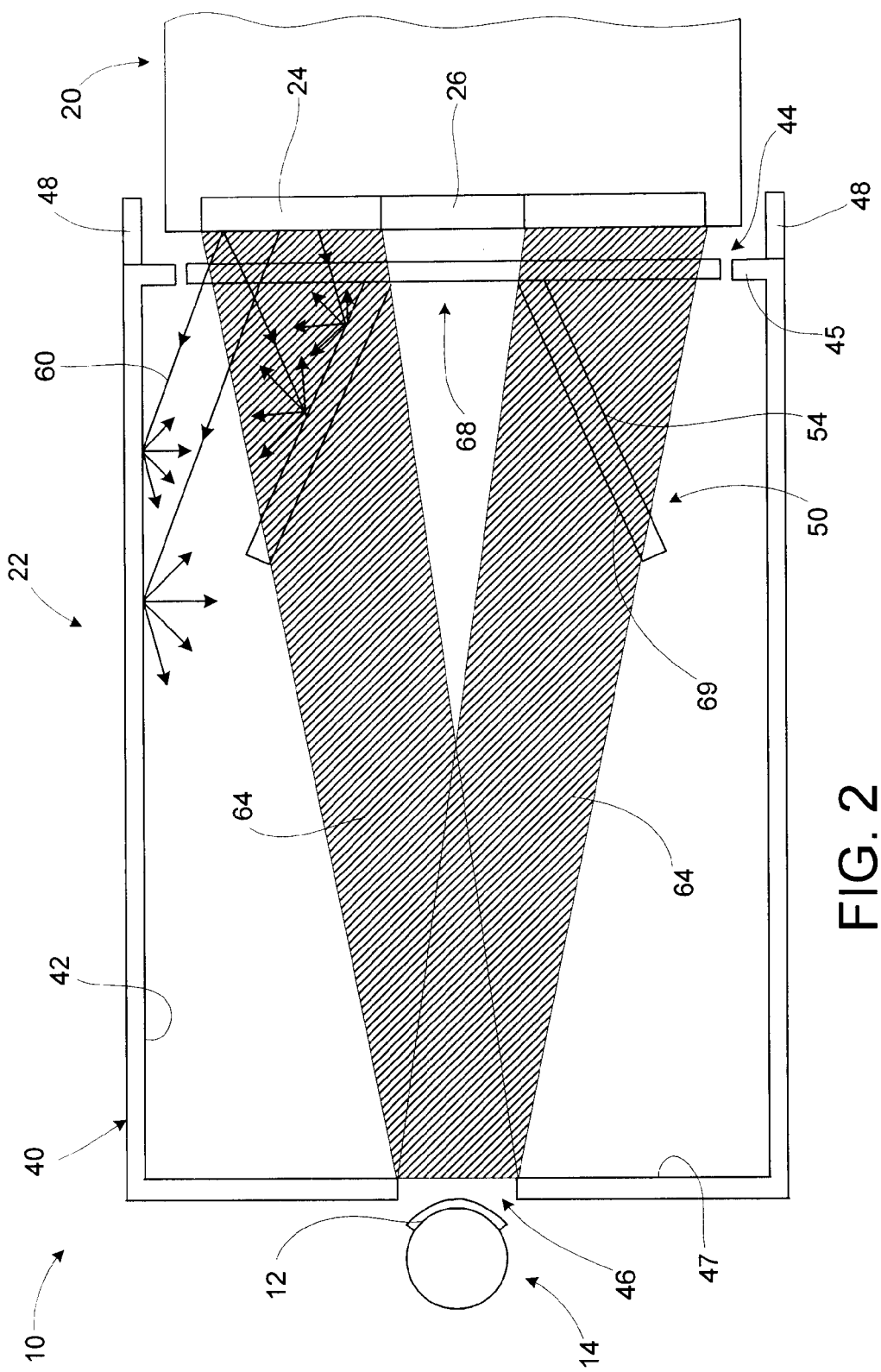
Figure 3:
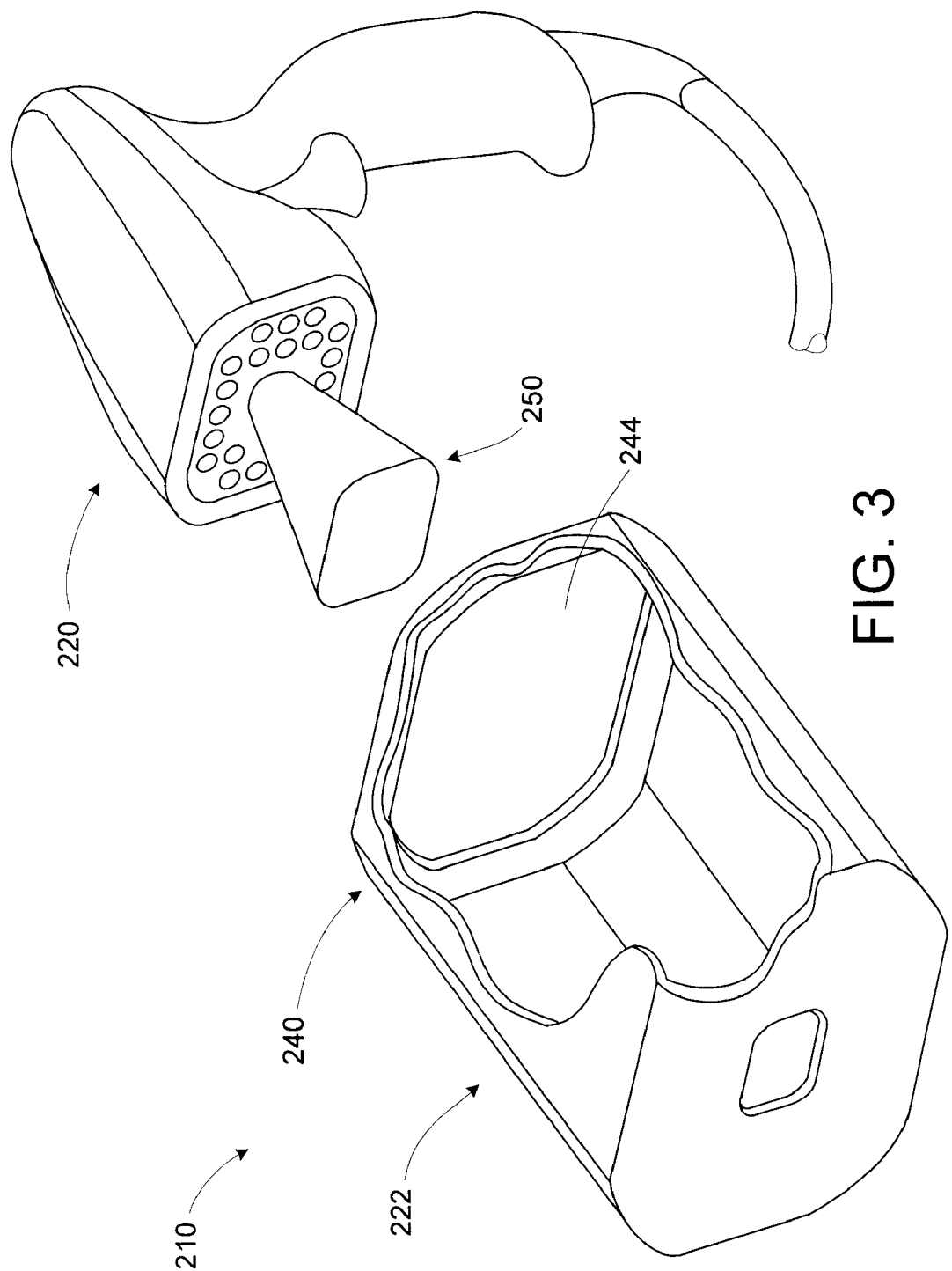
Figure 4:
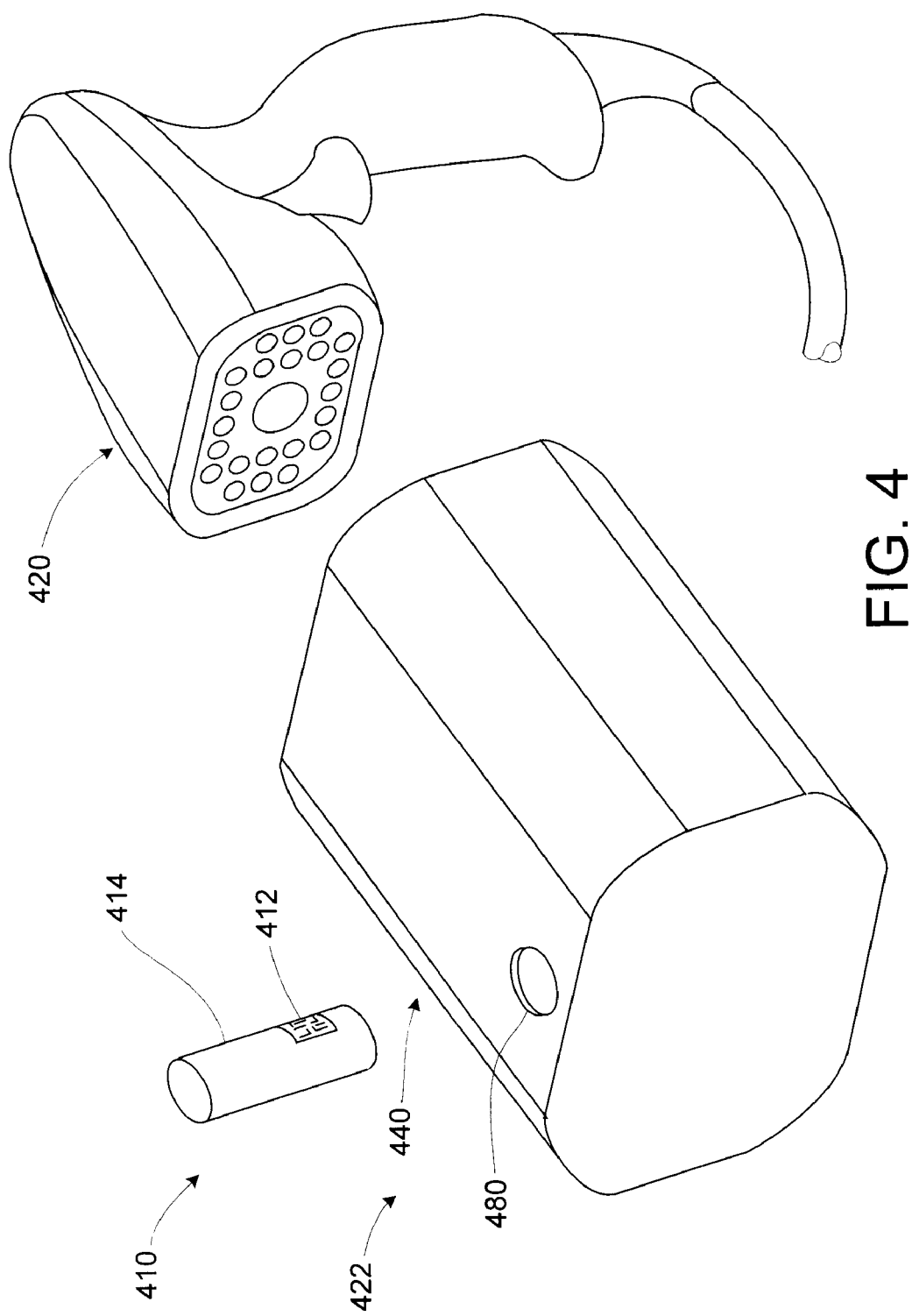

In the annexed drawings:

FIG. 1 is a fragmentary perspective view of a system for reading a bar code, according to the present invention;

FIG. 2 a plan view of the system of FIG. 1, illustrating light paths for indirect illumination of the bar code;

FIG. 3 is a fragmentary perspective view of an alternate embodiment system for reading a bar code, in accordance with the present invention; and FIG. 4 is a perspective view of another alternate embodiment system for reading a bar code, in accordance with the present invention.

Referring to FIG. 1, a system 10 is shown for reading a bar code 12 on an object 14. The system 10 includes a bar code reader 20 and a light diffusing cavity 22. The light diffusing cavity 22 deflects and diffuses light from a light source 24, which may be part of the reader 20. Preferably the light diffusing cavity 22 deflects substantially all of the light from the light source 24, so that none of the light from the light source 24 directly illuminates the bar code 12. Glare on the surface of the object 14 is greatly reduced by avoiding direct illumination of the bar code 12 by the light source 24.

Despite deflecting light from the light source 24, the light diffusing cavity 22 allows unhindered, or at least substantially unhindered, passage of light emanating from the bar code to a light detector (sometimes referred to below as a light detection system or as an imaging device) 26 which is part of the reader 20.

The reader 20 may be of a conventional design, and includes the light source 24 for providing light to illuminate the bar code to be read, and the light detection system 26 for detecting light emanated from the bar code. In an embodiment, the light diffusing cavity 22 facilitates using commercially available bar code readers 20 to read bar codes on objects in instances where direct reading absent the cavity 22 may encounter problems or difficulties due to glare.

The light source may, for example, be an array of LEDs, a photoflash light source, a laser light source, or another source of diffuse or non-diffuse light. The imaging device 26 converts the emanated light into a form which can be processed in order to detect the information represented by the bar code 12. An exemplary imaging device is an array of photodetectors such as charge coupled devices (CCDs), although it will be appreciated that other imaging devices, light detectors (in the visible and/or non-visible wavelength ranges), etc., may alternatively be used to detect light from an illuminated bar code 12. Other suitable imaging devices include electron tube devices such as an image orthicon and a vidicon.

The reader 20 includes a cable 30 for transferring data between the reader 20 and a computer 31 or other data processing device. For example, data from the imaging device 26 may be sent to the computer 31 for processing and decoding, as is conventional in the field of bar code readers and decoding of bar code information. The data may be represented by electrical signals, optical signals, or by some other means. The cable may also include wiring for providing power to the reader from an external power source. The data may be coupled to the data processing device by radio or other electromagnetic energy transmitting devices. A trigger 32 on the reader 20 is used to selectively activate the light source 24 to illuminate a bar code for reading. The trigger 32 may also be used to activate the imaging device and/or to send a signal to the computer 31 or other data processing device for processing data from the imaging device. The reader 20 has a handle 34 by which the reader may be manually gripped while allowing direct access to the trigger 32 which also may be manually operated in conventional fashion.

It will be appreciated that the reader 20 shown in the figures and described herein is exemplary of a variety of known types of bar code readers suitable for use with the invention. It also will be appreciated that although the reader is shown as a manually held and operated device, it alternatively may be a relatively fixed device or otherwise somewhat less portable than the manual device illustrated. Such a reader may be in a cabinet, on a stand or table, etc., and may be operated manually or in response to electrical or other signals, e.g., from the computer 31 or other source.

The light diffusing cavity 22 has a substantially-enclosed housing 40. The housing 40 has inner side wall surfaces 42 which serve to redirect deflected light originally emanating from the light source 24, to thereby indirectly illuminate a bar code 12. The housing 40 also prevents substantially all ambient light from illuminating the bar code 12. Thus the housing 40 provides repeatable illumination of bar codes regardless of the level or type of ambient light present. Further, the housing 40 greatly reduces the possibility that ambient light will produce glare or other irregularities in the bar code image. Reducing or eliminating the amount of glare is of particular importance when the bar code has a shiny, as opposed to a matte, surface.

The housing 40 has a reader window or opening 44 at one end or wall, e.g., a front wall 45, and a bar code window or opening 46 at the opposite end or wall, e.g., the rear wall 47. In operation, the reader 20 is pressed against the reader window 44 or is otherwise coupled to the light diffusing cavity 22, and is pointed at the bar code window 46 where a bar code to be read would be located. The reader window 44 is large enough so that the housing 40 preferably does not block light from the light source 24 from entering the housing.

It will be appreciated that the reader window 44 may be made of any of a variety of materials which transmit light therethrough or that the reader window may be open without any material therein. It will further be appreciated that about the reader window or opening, e.g., associated with the front wall 45, there may be guides or mounts for the reader to be pressed against. Alternatively or in addition there may be a seal or spacer, for example, a rubber gasket, around the reader window or opening 44. The seal and the guides or mounts may be used to prevent contact between the reader and the housing which would possibly result in damage to the reader, housing, or reader window; to provide a means for accurately and repeatably orienting the reader relative to the reader window; and/or to prevent ambient light from entering the reader window or opening. Such guides or mounts are shown schematically at 48 in FIG. 2.

The reader window may have non-uniform optical properties, for example, having different optical properties in a region where light from the light source passes through it than in the region where light passes back to the light detector.

It will be appreciated that the light diffusing cavity 22 may include means for clamping or otherwise coupling the housing 40 to the reader 20, thereby avoiding the need for the operator to continually press the reader against the housing during operation. Such coupling may be accomplished in a manner such that the reader can be quickly uncoupled from the housing. For example, the housing may have a mount which accepts conventionally sized and shaped readers, allowing the readers to slide into the mount. The reader window 44 may be such that when the bar code reader 20 is slid into the mount, the fit between the reader window 44 and the reader 20 is tight and self-supporting.

Mounted within the housing 40 is a light deflector 50 which deflects light from the light source 24 when the reader 20 is coupled to the light diffusing cavity 22. The deflector 50 has projections 52 for mounting the deflector to the housing walls and/or to the front wall 45. It will be appreciated that the deflector may be otherwise mounted to the housing.

The deflector 50 has a flared shape, relatively narrow near the reader window 44 and widening further from the reader window 44. The deflector 50 is hollow, allowing free passage of light from the bar code 12, when positioned in the bar code window 46, through the hollow area 53 to the light detector 26 of the reader 20. If desired, the area 53 may contain a light conducting solid material, e.g., glass, plastic, fiber optic material, etc. An outer surface 54 of the deflector 50 deflects light from the light source 24.

As shown in FIG. 2, the deflector 50 is preferably flared to a degree that it prevents any direct illumination of the bar code 12 (or other object on the bar code window 46) by the light source 24. Light 60 from the light source 24 first impinges either upon the outer surface 54 of the deflector 50 or upon the inner side wall surfaces 42 of the housing 40. The light paths between the light source 24 and the bar code window 46 which would provide direct illumination of the bar code 12, represented in FIG. 2 by the shaded region 64, are fully blocked by the deflector 50.

The deflector 50 has a hole 68 at its narrow end which allows light emanated from the bar code 12 to be received by the light detector 26 without being blocked by the deflector 50.

The deflector 50 is made of an opaque material. It may be made of metal, plastic, or other materials, such as rigid materials, suitable for use in the invention. It will be appreciated that the deflector may alternatively be made of a material which allows some of the light from the light source to pass therethrough, for example being made of a translucent material.

The outer surface 54 of the deflector 50 is a diffusive or matte surface, that is, the surface reflects impinging light by scattering it widely in a variety of directions. By diffusively deflecting the light, the possibility of glare from indirect lighting is further reduced. Examples of such a matte surface are white bond paper, flat wall paint, and white felt cloth. Plastic and metal surfaces may also be diffusive or matte, such as by having a roughened surface finish. Alternatively, however, the outer surface of the deflector may be a primarily reflective or glossy surface which reflects impinging light in a more concentrated, controlled or predetermined direction or directions.

An inner surface 69 of the deflector 50 is a diffusive or matte light absorbing surface. Examples of such surfaces are matte black paper, black cloth, and flat black paint. The light-absorbing diffusive inner surface 69 reduces the amount of diffused light from within the housing 40, which is not light emanating from the bar code, from reaching the imaging device 26. Such a light absorbing surface 69 also prevents light from the bar code indirectly reaching the imaging device 26, e.g., as by diffuse or specular reflection off the surface 69. It will be appreciated that alternatively the inner surface 69 of the deflector may be a white matte surface or some other finish, e.g., the same as the outer surface 54 of the deflector 52. In this latter case, it may be desirable to use a focusing element with the imaging device 26 to limit detected light to that from the area of a bar code 12 in the bar code window 46.

The deflector 50 has a flared shape with a substantially rectangular cross-section. It will be appreciated that the deflector may alternatively have other shapes, such as conical. The length and amount of flare in the deflector may be selected taking into account a number of desired characteristics, such as: that all or substantially of the light from the light source 24 be prevented from directly reaching the bar code 12 at the bar code window 46; that an acceptable amount of light from the light source indirectly reaches the bar code to illuminate the bar code; and that the deflector be relatively small in size to reduce manufacturing costs and to facilitate coupling of the deflector and the housing. It will be appreciated that other characteristics may be taken into account in selecting a size and shape for the deflector. Preferably the deflector 50 is flared to the extent that substantially all or a major portion of the light rays emanating from the light source 24 are blocked from directly impinging upon the bar code or any portion thereof. The opening of the deflector 50 which is closest to the light detector 26 preferably is sufficiently large to allow all of the bar code image to lie within the field of view of the light detector 26, but small enough such that no rays from the light source 24 pass into the deflector 50.

It will be understood that if desired the geometry of the deflector may be selected such that is deflects less than substantially all of the light which would otherwise directly illuminate the bar code. This might be desired if some direct illumination of the bar code is acceptable.

The inner and outer deflector surfaces 54, 69 may have different shapes from one another, for example by the deflector having a nonuniform thickness. Different shapes for the inner and outer deflector surfaces may be desirable given the different functions of the two surfaces: the outer deflector surface's function of deflecting light from the light source, and the inner deflector surface's function of preventing light from the bar code to pass indirectly to the light detector.

The inner side wall surfaces 42 of the housing 40 also preferably have a matte surface in order to facilitate indirectly illuminating the bar code without glare. The inner side wall surfaces are preferably bright white surfaces so as to diffusively reflect a maximum amount of impinging light. It will be appreciated that other types of scattering or reflecting surfaces may be employed, however.

The housing 40 is shown in the figures as a rectangular box, with its side walls substantially parallel to a line between the bar code 12 and the light detector 26. However, it will appreciated that the housing may have a different shape, consistent with its function of allowing light from the light source to indirectly illuminate the bar code. The geometry of the housing may be selected in combination with that of the deflector and/or the reader 20 to optimize the process of the indirect illumination of the bar code. The housing 40 is preferably large enough so that the deflector 50 does not approach the inner walls of the housing 40 so closely that the amount of light emanating from the light source 24 is substantially limited from ultimately reaching the bar code.

The housing 40 has a holder 70 thereupon for positioning and securing the object 14 so that the bar code 12 is placed adjacent the bar code window 46. The holder 70 has a platform 72 which supports the object 14, and clips 74 which hold the object 14 in place. The platform 72 may be of the same material as the housing 40, and may be integrally formed with the housing 40. Alternatively the platform may be a separate piece of material which is connected to the housing.

The clips 74 are spring clips attached to the housing 40 and are of a shape and size designed to hold the object 14. The clips may be made out of a resilient material such as metal or plastic, for example. Other types of suitable clamps for holding an object in place will be apparent to one skilled in the art. For example, the clip 74 and the platform 72 may be replaced with or augmented by a channel-like member into which the object 14 snugly fits. The snug fit may provide the support needed to hold the object in place.

It will be appreciated that the holder may be able to accept a wide variety of differently sized and shaped objects. As an example, the object 14 may be a package or container which contains a single cigarette. Such cigarette containers are relatively small, e.g., about the size of the cigarette, are cylindrical and usually have a relatively glossy surface, all of which make it relatively difficult to accurately and quickly read a bar code 12 thereon, especially due to glare caused by direct illumination of the bar code from a light source 24, for example. Such bar codes may contain various information, one example of which is information representing proper payment of tax associated with cigarettes.

It will further be appreciated that the holder may be separate from the light diffusing cavity. In such an embodiment the holder would secure the object, for example a cylindrical container, with its bar code in a certain position and orientation. The housing may have provisions for aligning the holder and the housing in a preferred relative position and orientation to facilitate reading of the bar code.

The term bar code, as used herein, is to be understood to include a broad range of machine-readable information-bearing codes, symbols, markings, and patterns. Included in the definition, for example, are one-dimensional and two-dimensional bar codes, as well as alphanumeric codes. It is expected that additional types of machine-readable codes will be developed in the future, and the definition includes such future-developed codes.

Although the invention is described above as involving a reader pointed directly at the bar code to be read, it will be understood that the invention is not so limited. Optical elements, such as mirrors, may be used to redirect light from the reader's light source and/or to redirect light emanating from the bar code.

The system 10 described above may be used to read a bar code 12 by indirectly illuminating the bar code 12 and detecting light emanating from the bar code.

The light for illuminating the bar code 12 is generated by the light source 24. It has its direction changed and may be scattered by the deflector 50, preferably such that there is no substantial direct illumination of the bar code 12 by light from the light source 24. After deflection of the light by the deflector 50, the illuminating light impinges upon inner side wall surfaces 42 of the housing 40, from whence a portion of it is redirected to indirectly illuminate the bar code 12. In operation, the bar code 12 is preferably shielded from ambient light by the housing 40 and the portion of the reader 20 which is coupled to the housing 40.

Light emanating from the bar code 12 due to reflection off of the surface of the bar code is received preferably substantially unhindered by the light detector 26. This received light is processed to obtain the information contained in the bar code 12.

It will be understood that a bar code location may be defined as the location of the bar code 12 relative to the housing 40. Similarly, a light source location and a light detector location may be defined respectively as the locations of the light source 24 and the light detector 26 relative to the housing 40.

What follows are descriptions of alternate embodiments of the invention. For the sake of brevity, some details are omitted in the description of portions of the alternate embodiments which are identical or similar to those in the embodiment already described.

FIG. 3 shows an alternate embodiment system 210 in which the bar code reader 220 has a deflector 250 coupled directly thereto. The deflector may be permanently fixedly attached to the reader, for example by gluing or soldering, or the deflector may be removably mounted to the reader. For example, the proximal end of the deflector 50 may have a cup-shaped form which fits snugly over the end of the reader 20 such that the deflector 50 is coupled thereto. The cup-shaped form may be comprised of transparent plastic so that the light emanating from the light source is not blocked. Alternatively, the cup-shaped form may have openings which allow light rays to pass therethrough.

In operation, the reader 220 is coupled to or pressed up against a housing 240 which is part of the light diffusing cavity 222. The deflector 250 passes through a reader opening 244 in the housing 240. A reader mount on the housing (not shown) may be used to properly position the reader 220 and the deflector 250 relative to the housing 240.

FIG. 4 illustrates another alternate embodiment, a system 410 in which a housing 440 of a light diffusing cavity 422 has an object opening 480 for admitting an object 414 which has a bar code 412 thereupon. The object 414 may be positioned and, if desired, secured within the housing 440 so as to position the bar code 412 in a desired location relative to a bar code reader 420 which provides light to illuminate the bar code 412 and receives light emanating from the bar code 412. Such securing may be accomplished by using a holder similar to that described earlier in regard to the embodiment shown in FIG. 1 and described above, with the obvious modification that the holder for this alternate embodiment would be inside the housing.

The object opening 480 has a circular shape, corresponding to the cylindrical object 414 the object opening 480 is designed to admit. However, it will be appreciated that the object opening may have any of various shapes, and may not necessarily correspond to the shape of objects to be inserted into the housing therethrough.

It will further be appreciated that the light diffusing cavity 422 may be such that the object 414 is only partially inserted into the object opening 480 for reading of the bar code 412. In such an instance the light diffusing cavity may have a seal to prevent ambient light from entering the housing in the gap between the object opening and the object. For example, there may be a resilient seal about the perimeter of the object opening.

To control the position of a partially-inserted object, there may be a stop within the housing which the object is to pushed up against.

Alternatively, the light diffusing cavity 422 may be such that the object 414 is fully inserted through the object opening 480 for reading of the bar code 412. The light diffusing cavity in such an instance may include a mechanism for ejecting the object through the opening subsequent to reading. In addition, the light diffusing cavity may include a door or other cover to block ambient light which would otherwise enter the housing through the uncovered object opening.

The invention, therefore, includes means for reading a bar code having a glossy surface, while reducing the potential for misreadings and/or loss of information due to glare caused by direct illumination of the surface. To the accomplishment of this the invention includes means for deflecting light generated by a light source of the reader, and means for using that deflected light to indirectly illuminate the bar code.

In using the invention a bar code or the like is indirectly illuminated, and light representing the bar code information is provided for decoding. The light from the bar code may be detected and decoding may be carried out by a computer or other device.

In using the invention a bar code or the like is indirectly illuminated by a light source of a bar code reader via a housing and deflector which deflect light from the light source and to indirectly illuminate the bar code, and light representing the bar code information is provided the bar code reader.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An apparatus for use with a bar code reader in reading a bar code, comprising:
   a housing with respect to which a bar code reader and a bar code to be read may be placed, said housing including
      a deflector preventing at least a portion of light emitted by a light source from directly impinging upon the bar code, and
      at least one surface, separate from the deflector, altering the direction of, and directing to the bar code, at least some of the at least a portion of light;
      wherein the deflector has an opening therethrough to allow light emanating from the bar code to pass through to the reader; and
      wherein the at least one surface is part of an external wall of the housing.

2. The apparatus of claim 1 wherein the deflector is coupled to a bar code reader.

3. The apparatus of claim 1 wherein the housing is a substantially-enclosed housing.

4. The apparatus of claim 3 wherein the housing includes a holder for positioning and securing an object having the bar code thereupon.

5. An apparatus for use with a bar code reader in reading a bar code, comprising:
   a housing with respect to which a bar code reader and a bar code to be read may be placed, said housing including
      a deflector, separate from the deflector, preventing at least a portion of light emitted by a light source from directly impinging upon the bar code, and
      at least one surface altering the direction of, and directing to the bar code, at least some of the at least a portion of light;
      wherein the deflector has an opening therethrough to allow light emanating from the bar code to pass through to the reader;
      wherein the deflector allows light including information represented by the bar code to pass substantially unhindered along one or more substantially straight paths to a light detector which is part of the bar code reader; and
      wherein the at least one surface is part of an external wall of the housing.

6. An apparatus for use with a bar code reader in reading a bar code, comprising:
   a housing with respect to which a bar code reader and a bar code to be read may be placed, said housing including
      a deflector, separate from the deflector, preventing at least a portion of light emitted by a light source from directly impinging upon the bar code, and
      at least one surface directing to the bar code at least some of the at least a portion of light,
      wherein the deflector has an opening therethrough to allow light emanating from the bar code to pass through to the reader,
      wherein the deflector is made of an opaque material, and
      wherein the at least one surface is opaque.

7. An apparatus for use with a bar code reader in reading a bar code, comprising:
   a housing with respect to which a bar code reader and a bar code to be read may be placed, said housing including
      a deflector preventing at least a portion of light emitted by a light source from directly impinging upon the bar code, and
      at least one surface, separate from the deflector, directing to the bar code at least some of the at least a portion of light,
      wherein the deflector has a diffusive outer surface which diffuses the at least a portion of light, and wherein the deflector has a light absorbing inner surface.

8. An apparatus for use with a bar code reader in reading a bar code, comprising:
   a housing with respect to which a bar code reader and a bar code to be read may be placed, said housing including
      a deflector preventing at least a portion of light emitted by a light source from directly impinging upon the bar code, and
      at least one surface, separate from the deflector, directing to the bar code at least some of the at least a portion of light,
      wherein the deflector has a flared shape: and
      wherein the at least one surface is opaque.

9. An apparatus for use with a bar code reader in reading a bar code, comprising:
   a housing with respect to which a bar code reader and a bar code to be read may be placed, said housing including
      a deflector preventing at least a portion of light emitted by a light source from directly impinging upon the bar code, and
      at least one opaque surface, separate from the deflector, directing to the bar code at least some of the at least a portion of light,
      wherein the deflector has an opening therethrough to allow light emanating from the bar code to pass through to the reader, and wherein the deflector and the at least one surface are connected together.

10. An apparatus for use with a bar code reader in reading a bar code, comprising;

a housing with respect to which a bar code reader and a bar code to be read may be placed, said housing including
    a deflector preventing at least a portion of light emitted by a light source from directly impinging upon the bar code, and
    at least one surface, separate from the deflector, directing to the bar code at least some of the at least a portion of light,
    wherein the at least one surface has a diffusive surface for directing to the bar code the at least some of the light,
    wherein the deflector is located along a centerline of the housing,
    wherein the deflector deflects the at least a portion of light away from the centerline, and
    wherein the diffusive surface is substantially parallel to the centerline.

11. An apparatus for use with a bar code reader in reading a bar code comprising:
a housing with respect to which a bar code reader and a bar code to be read may be placed, said housing including
    a deflector preventing at least a portion of light emitted by a light source from directly impinging upon the bar code, and
    at least one surface directing to the bar code at least some of the at least a portion of light,
    wherein the housing is a substantially-enclosed housing, wherein the at least one surface Is part of the housing,
    wherein the housing has an opening for allowing objects to be inserted into the housing and removed from the housing,
    wherein the opening is a circular opening configured to receive, fully within the housing, at least a cylindrical part of a cylindrical object.

12. The apparatus of claim 11,
wherein the at least one surface is separate from the deflector, and
wherein the at least one surface is opaque.

13. An apparatus for use with a bar code reader in reading a bar code, comprising:
a housing with respect to which a bar code reader and a bar code to be read may be placed, said housing including
    a deflector preventing at least a portion of light emitted by a light source from directly impinging upon the bar code, and
    at least one surface directing to the bar code at least some of the at least a portion of light,
    wherein the housing is a substantially-enclosed housing, wherein the at least one surface is part of the housing, wherein the housing includes a holder for positioning and securing an object having the bar code thereupon, and wherein the holder includes a platform.

14. An apparatus for use with a bar code reader in reading a bar code, comprising:
a housing with respect to which a bar code reader and a bar code to be read may be placed, said housing including
    a deflector preventing at least a portion of light emitted by a light source from directly impinging upon the bar code, and
    at least one surface directing to the bar code at least some of the at least a portion of light,
    wherein the housing is a substantially-enclosed housing, wherein the at least one surface is part of the housing, wherein the housing includes a holder for positioning and securing an object having the bar code thereupon, and wherein the holder includes one or more clamps.

15. An apparatus for use with a bar code reader in reading a bar code, comprising:
a housing with respect to which a bar code reader and a bar code to be read may be placed, said housing including
    a deflector preventing at least a portion of light emitted by a light source from directly impinging upon the bar code, and
    at least one opaque surface, separate from the deflector, directing to the bar code at least some of the at least a portion of light,
    wherein the housing is a substantially-enclosed housing, wherein the at least one surface is part of the housing, wherein the deflector is coupled to the housing,
    wherein the housing includes a bar code window opposite the deflector, and wherein the deflector and the bar code window are substantially along a centerline of the housing.

16. A method for reading a bar code, comprising:
indirectly illuminating the bar code by using a deflector between a light source and the bar code, the deflector deflecting at least a portion of source light emanating from the light source; and
receiving light emanating from the bar code through an opening in the deflector;
wherein the indirectly illuminating also includes deflecting the source light off of one or more opaque surfaces an additional one or more times.

17. The method of claim 16, further comprising, prior to the indirectly illuminating, shielding the bar code from ambient light.

18. The method of claim 16 wherein the source light impinges on a diffusing surface of the deflector.

19. The method of claim 18 wherein the deflecting further includes diffusively reflecting light off of one or more surfaces of a housing.

20. The method of claim 16 wherein the light source is part of a bar code reader.

21. The method of claim 20 wherein the receiving includes receiving via a light detector which is part of the reader.

22. The method of claim 16 wherein the deflector is substantially opaque, allowing substantially no light therethrough.

23. An apparatus for use in reading a bar code using a bar code reader, comprising:
a deflector between a tight source location and a bar code location, the deflector preventing at least a portion of light emitted at the light source location from directly reaching the bar code location: and
at least one opaque surface, separate from the deflector, at least partially in the path of the at least a portion of light, the at least one surface directing at least some of the portion of light to the bar code location;
wherein the deflector has an opening allowing substantially unhindered passage of light between the bar code location and a light detector location.

24. The apparatus of claim 23, wherein the at least one surface is substantially parallel to a line between the bar code location and the light detector location.

25. The apparatus of claim 23, wherein the at least one surface is part of a housing.

26. The apparatus of claim 25, wherein the deflector is attached to the housing.

27. The apparatus of claim 23, wherein the deflector is substantially opaque, allowing substantially no light therethrough.

28. An apparatus for use in reading a bar code using a bar code reader, comprising:
   a deflector between a light source location and a bar code location, the deflector preventing at least a portion of light emitted at the light source location from directly reaching the bar code location; and
   at least one opaque surface, separate from the deflector, at least partially in the path of the at least a portion of light, the at least one surface directing at least some of the portion of light to the bar code location;
   wherein the deflector has an opening allowing substantially unhindered passage of light between the bar code location and a light detector location;
   wherein the at least one surface is part of a housing; and
   wherein the housing has a bar code window and a reader window at opposite ends.

29. The apparatus of claim 28, wherein the housing includes a guide or mount at the reader window end.

30. A system for reading a bar code, comprising:
   a bar code reader having a centrally-located light detector and a plurality of light source elements encircling the light detector; and
   a housing with respect to which the bar code reader and a bar code to be read may be placed, the housing including
      a deflector therewithin preventing at least a portion of light emitted by a light source from directly impinging upon the bar code, and
      at least one opaque surface, separate from the deflector, altering the direction of, and directing to the bar code, at least some of the at least a portion of light;
   wherein the deflector allows light emanating from the bar code to pass substantially unhindered therethrough to the light detector.

31. The system of claim 30 wherein the deflector has an opening that allows the light emanating from the bar code to pass therethrough.

32. The system of claim 31 wherein the opening in the deflector allows light including information represented by the bar code to pass substantially unhindered along one or more substantially straight paths to the light detector.

33. The system of claim 30 wherein the deflector encircles the light detector.

34. The system of claim 33 wherein at least part of the deflector is encircled by the light source elements.

35. The system of claim 30 wherein the deflector is substantially opaque, allowing substantially no light therethrough.

* * * * *